United States Patent
Bassett

(10) Patent No.: US 10,021,116 B2
(45) Date of Patent: Jul. 10, 2018

(54) NETWORK SEGMENTATION

(71) Applicant: HCA Holdings, Inc., Nashville, TN (US)

(72) Inventor: Gabriel David Bassett, Fairview, TN (US)

(73) Assignee: HCA Holdings, Inc., Nashville, TN (US)

( * ) Notice: Subject to any disclaimer, the term of this patent is extended or adjusted under 35 U.S.C. 154(b) by 180 days.

(21) Appl. No.: 14/623,806

(22) Filed: Feb. 17, 2015

(65) Prior Publication Data

US 2015/0236935 A1  Aug. 20, 2015

Related U.S. Application Data

(60) Provisional application No. 61/941,733, filed on Feb. 19, 2014.

(51) Int. Cl.
| | |
|---|---|
| *G06F 15/173* | (2006.01) |
| *H04L 29/06* | (2006.01) |
| *H04L 12/26* | (2006.01) |
| *H04L 12/24* | (2006.01) |

(52) U.S. Cl.
CPC .......... *H04L 63/1408* (2013.01); *H04L 41/14* (2013.01); *H04L 43/18* (2013.01); *H04L 41/08* (2013.01); *H04L 63/1425* (2013.01)

(58) Field of Classification Search
CPC ..... H04L 67/22; H04L 63/1408; H04L 41/14; H04L 43/18; H04L 41/08; H04L 63/1425
USPC ....................................................... 709/224
See application file for complete search history.

(56) References Cited

U.S. PATENT DOCUMENTS

| | | | | |
|---|---|---|---|---|
| 7,359,930 B2* | 4/2008 | Jackson | ............. | H04L 41/0893 709/200 |
| 7,822,816 B2* | 10/2010 | Payne | .................... | G06Q 10/10 709/203 |
| 8,130,767 B2* | 3/2012 | Aitken | .................... | H04L 47/10 370/401 |
| 8,418,249 B1* | 4/2013 | Nucci | .................... | G06F 21/552 706/20 |
| 8,424,072 B2* | 4/2013 | Pullikottil | ........... | H04L 63/1425 380/232 |
| 8,737,204 B2* | 5/2014 | Szabo | ................... | H04L 41/145 370/229 |
| 8,751,629 B2* | 6/2014 | White | ............... | G09B 19/0053 703/13 |
| 8,789,171 B2* | 7/2014 | Osipkov | ............. | H04L 63/1408 726/22 |

(Continued)

*Primary Examiner* — Joseph E Avellino
*Assistant Examiner* — Binod J Kunwar
(74) *Attorney, Agent, or Firm* — Kilpatrick Townsend & Stockton LLP

(57) ABSTRACT

A method and system for segmenting a network including a plurality of hosts is disclosed. In an example embodiment, the network is a provider network. The method receives network activity information describing network traffic between hosts of the plurality. The method generates observations from the network activity information and organizes the observations into clusters. The method determines a profile for each cluster that corresponds to a potential system type implemented by one or more of the hosts of the medical provider network. The method determines segments within the provider network based on the profiled system types.

18 Claims, 10 Drawing Sheets

(56) References Cited

U.S. PATENT DOCUMENTS

| | | | | |
|---|---|---|---|---|
| 8,817,655 | B2* | 8/2014 | Szabo | G06K 9/6267 |
| | | | | 370/253 |
| 8,881,289 | B2* | 11/2014 | Basavapatna | G06F 21/552 |
| | | | | 726/25 |
| 9,355,167 | B2* | 5/2016 | Gomes | G06F 17/30525 |
| 9,483,742 | B1* | 11/2016 | Ahmed | G06N 99/005 |
| 2007/0245420 | A1* | 10/2007 | Yong | H04L 41/28 |
| | | | | 726/23 |
| 2008/0249820 | A1* | 10/2008 | Pathria | G06Q 10/10 |
| | | | | 705/2 |
| 2009/0138592 | A1* | 5/2009 | Overcash | H04L 63/1425 |
| | | | | 709/224 |
| 2010/0034102 | A1* | 2/2010 | Wang | H04L 41/0893 |
| | | | | 370/252 |
| 2010/0125911 | A1* | 5/2010 | Bhaskaran | G06Q 10/10 |
| | | | | 726/23 |
| 2010/0325731 | A1* | 12/2010 | Evrard | G06F 21/577 |
| | | | | 726/25 |
| 2011/0040756 | A1* | 2/2011 | Jones | G06F 17/30864 |
| | | | | 707/737 |
| 2012/0278890 | A1* | 11/2012 | Maatta | H04L 43/062 |
| | | | | 726/23 |
| 2012/0284791 | A1* | 11/2012 | Miller | G06F 21/554 |
| | | | | 726/22 |
| 2012/0304287 | A1* | 11/2012 | Yu | G06F 21/56 |
| | | | | 726/22 |
| 2013/0083806 | A1* | 4/2013 | Suarez Fuentes | H04L 41/0893 |
| | | | | 370/465 |
| 2015/0067845 | A1* | 3/2015 | Chari | G06F 21/50 |
| | | | | 726/23 |

* cited by examiner

NETWORK SEGMENTATION

CROSS-REFERENCES TO RELATED APPLICATIONS

The present application claims the benefit of U.S. Provisional Application No. 61/941,733, filed on Feb. 19, 2014, the full disclosure of which is incorporated herein by reference.

BACKGROUND

This specification relates in general to network segmentation and, but not by way of limitation, to automatically segmenting a network using clustering techniques.

Modern day computer networks are configured to support communications between a variety of hosts running different applications which are operated by different users having different types of user profiles. As the size and complexity of these computer networks grow, the difficulty in comprehending and securing such networks increases. This is especially true in networks which have been running for numerous years. One way to secure such networks is to assign a profile to each host. The profile may indicate certain privileges the host has and how the host is expected to operate. Manual techniques have been developed for assigning profiles to hosts. Such manual techniques may be sufficient for new hosts, but can prove time consuming to assign profiles to existing hosts. Moreover, such manual techniques may not allow for ongoing monitoring, and may therefore be exploitable by nefarious users.

SUMMARY

In one embodiment, a computer system receives network activity information. The network activity information describes interactions of a plurality of hosts on a network. The computer system also identifies one or more metrics based in part on at least a portion of the network activity information. The one or more metrics identify relationships between hosts of the plurality of hosts. The computer system also determines a plurality of observation vectors based at least in part on the one or more metrics. The individual observation vectors of the plurality include one or more dimensions and are associated with individual hosts of the plurality of hosts. The computer system also generates a plurality of clusters based in part on the plurality of observation vectors. Each cluster of the plurality of clusters includes at least some hosts of the plurality of hosts. The computer also identifies, in response to generating the plurality of clusters, a profile for at least one cluster of the plurality of clusters. The profile indicates at least a potential system of the network. The computer system also determines a segment within the network. The segment includes or excludes the potential system with respect to interactions on the network.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Various embodiments in accordance with the present disclosure will be described with reference to the drawings, in which.

DETAILED DESCRIPTION

Figure 1:
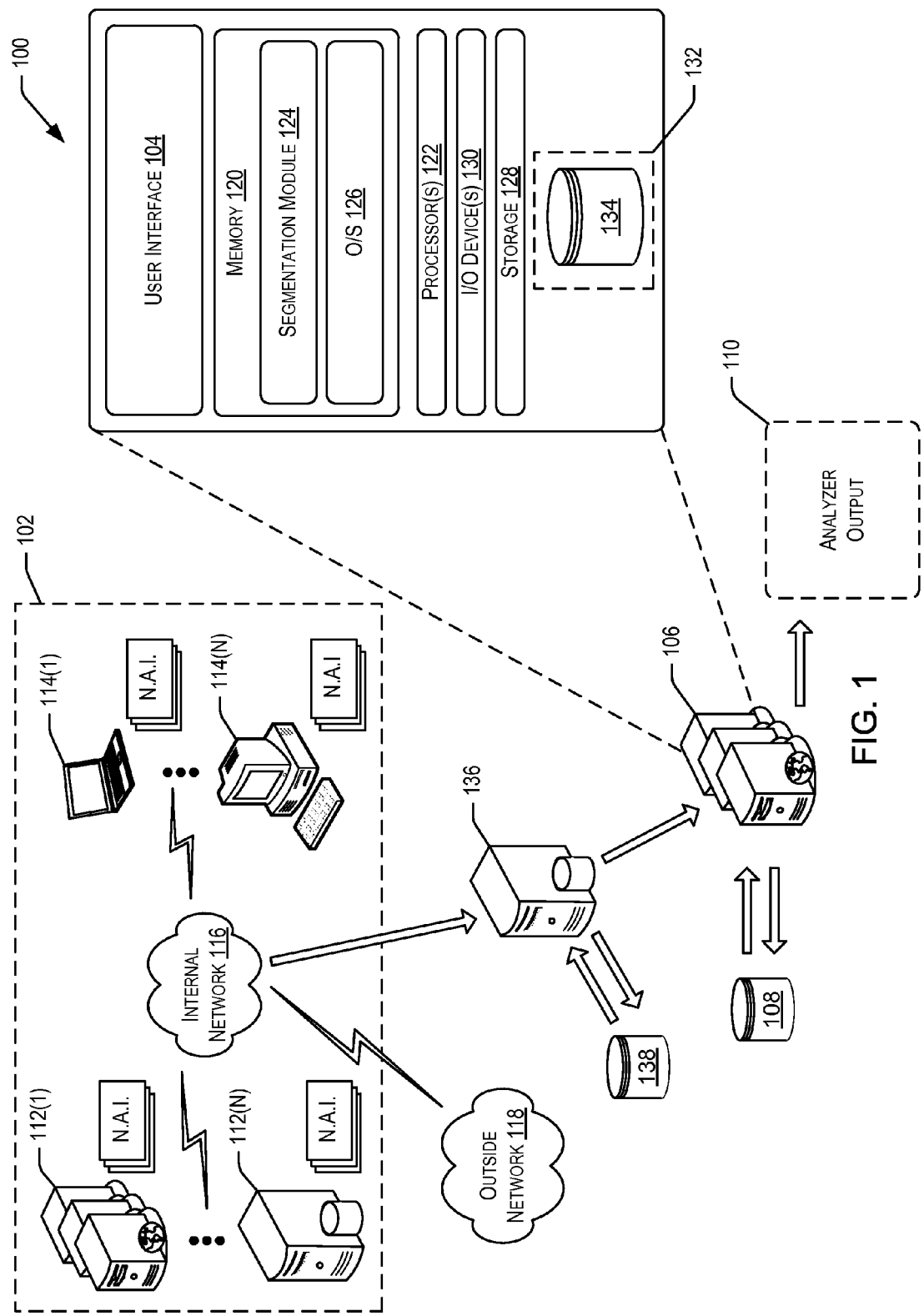
FIG. 1 illustrates an example schematic architecture for implementing techniques relating to network segmentation as described herein, according to at least one embodiment.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides systems and methods (i.e., a profiling and segmentation system) to automatically profile hosts of a network, particularly hosts of a medical provider network, using network traffic between the hosts of the network. In this embodiment, once host profiles are discovered by the segmentation system, a network administrator or other authorized user uses the host profiles and other considerations to segment the medical provider network. In an embodiment, the process of profiling the hosts of the network results in an automatic segmentation of the network. Depending on a particular embodiment, the segments act as enclaves of systems, between which network tools may be implemented to produce one or more effects (e.g., filter, monitor, limit, reduce, redirect, ignore, allow, throttle, etc.) on the network traffic. A particular segment, in some examples, is established with respect to applications, system purposes within the network (e.g., medical devices operating in the network, control systems communicating over the network, and the like), system criticality within the network, organization outside the network represented within the network, physical location, network location, and the like. In this embodiment, the network traffic is monitored and collected as network activity information. In some embodiments, the network activity information is periodically stored in a particular format, such as a format associated with a version of NETFLOW. The network activity information identifies characteristics, metrics, features, or dimensions (e.g., source internet protocol (IP) address, destination IP address, source port, destination port, byte rate, byte total, etc.) of network activity between hosts of the network. For example, in an embodiment, there is more than one record of network activity between each of particular hosts. Using the techniques described herein, these records can be processed to summarize the records without sampling. In some embodiments, this summary may reduce multiple records to a single observation vector for each host pairing (i.e., two hosts) of the network. In some embodiments, observation vectors are developed for each host on an individual basis (i.e., an observation vector describing the network activity information for one host). The observation vectors can have more than one dimension (i.e. be multi-dimensional). The records are summarized to observation vectors periodically (e.g., daily, weekly, etc.) based on an observation period or in a real time streaming fashion and stored in a graph database. In this embodiment, using techniques described herein, clusters are developed using clustering machine learning algorithms from the observation vectors. Depending on the particular clustering algorithm selected, the number of clusters can be pre-determined, automatically determined as part of the technique, and any combination of pre-determined and automatic. In this embodiment, the segmentation system analyzes the clusters to determine what each cluster represents (i.e., the segmentation system develops a cluster profile for each cluster based on the characteristics of the observation vectors associated with each cluster). For instance, an example cluster profile for a cluster might indicate that the cluster system (i.e., the collection of vectors representing hosts and host pairings) of the cluster is potentially representative of a system consisting of database servers. In this embodiment, additional information from outside sources (e.g., IP Address Management solutions, common port usage lists, organizational knowledge, and organizational documentation) is used to help identify the system. Once a cluster profile is developed for each cluster and the potential cluster system for each cluster determined, the segmentation system has in essence discovered many of the relationships between the hosts of the network. Based on these determinations, in this embodiment, the network can then be segmented. Future hosts summarized with associated observation vectors may have their system type determined by association of the observation vector with the pre-established clusters.

In another embodiment, the present disclosure provides systems and methods (i.e., segmentation system) to identify compromised hosts within a network, particularly hosts of a medical provider network, using network traffic between the hosts of the network. Similarly as discussed above, the segmentation system of this embodiment, begins by analyzing network activity information. From this analysis, the segmentation system is configured to identify metrics that describe a network relationship between the hosts of the network, generate observation vectors for the hosts and host pairings, and from the observation vectors, generate clusters.

In this embodiment, the observation vectors are multi-dimensional. The number of dimensions however depends in part on the number of characteristics identified for the host or host pairing. Next, as discussed above, in this embodiment, the segmentation system identifies one or more cluster profiles for each cluster. The cluster profile is defined by the characteristics of the observation vectors that comprise the cluster. Distinguishable from other embodiments, in this embodiment, once the clusters are generated the segmentation system is configured to monitor hosts or nodes of the cluster graphs over a period of time. In one example, after the segmentation system identifies a profile for a cluster, it monitors changes in the observation vectors of vectors within clusters, vectors outside of clusters, and the like. In this embodiment, this monitoring enables the segmentation system to identify hosts or nodes that may have been compromised. For example, if the segmentation system determines that over a particular period of time a vector previously associated with a cluster having a database server profile, is now behaving more like a web server as well, then it may be plausible to assume that the host which the vector represents has been compromised (i.e., being used for malicious purposes). In this manner, the segmentation system assists a network administrator or other authorized user to identify compromised hosts. In a similar embodiment, clusters are created representing compromised hosts. If the segmentation system determines that a vector appears to be part of or near to the cluster of compromised hosts, then it may be plausible to assume that the host which the cluster represents has been compromised.

In yet another embodiment, the present disclosure provides systems and methods (i.e., a segmentation system) to track user interaction, particularly users of a medical provider network, using network interactions of the users with hosts of the network. Similarly as discussed above, the segmentation system of this embodiment, begins by analyzing network activity information. From this analysis, the segmentation system is configured to identify metrics that describe user interactions with hosts of the network. In this embodiment, a client profile is generated for one or more users based on the metrics. This client profile describes temporal paths of the user as the user interacts with the hosts of the network. In some examples, the client profile is characterized as a state transition profile or a profile of changes in state of a particular client. The client profile treats each interaction with a particular host as a state of a state machine. Thus, in this embodiment, the user's interactions with the hosts of the network are profiled as movement from one host to another host is treated as a state change in the state machine. In some embodiments, the client profile is time dependent. In other words, the client profile can differ during working hours, compared to non-working hours. In some examples, the client profile includes a plurality of sub-profiles for different times. In other examples, separate profiles are created for each time during the day, and depending on the time of the interaction being analyzed the segmentation system selects an appropriate corresponding profile. The client profile also predicts future state changes of the user. In some embodiments, client profiles include sub-profiles or are used to create additional profiles, such as probability profiles which indicate probabilistic future state changes of the user or user profile. In this embodiment, however, the client profile for the user indicates probabilistic future state changes of the user or user profile. For example, the client profile indicates that during working hours the user visits hosts A, D, X, and R in the following order: R, A, D, and X. Depending on the amount of historical data available (e.g., network activity information), the client profile can also indicate that the user has a certain probability of visiting these hosts in this order. If the system recognizes that the user visits hosts, including a new host Q, in the following order: R, Q, D, X, and A, then it may mean that the user or the user's profile has been compromised. Thus, in some examples, if the user begins to make state changes that are outside the client profile for the user, the segmentation system may plausibly conclude that the user is anomalous with respect to normal activity. In an embodiment, the segmentation system is configured to generate an alert, take some action, notify an administrator or authorized user, take some other action, and the like.

Referring first to FIG. 1, segmentation environment 100 for implementing the methods and systems described herein is presented according to an embodiment. According to this embodiment, the segmentation environment 100 includes organization 102, such as a medical provider organization, network activity collector 136, network activity storage 138, network activity analyzer 106, network activity analysis storage 108, and network analyzer output 110. While the techniques will be described within the context of a medical provider organization, it is within the knowledge of a person having ordinary skill in the art to apply these principles to other networks including hosts and clients. Turning first to the organization 102 which is defined by the dashed rectangle. In this embodiment, the organization 102 includes components of an organization associated which provides medical services to patients and includes a plurality of hosts with other entities, other organizations, medical offices, hospitals, clinics, emergency care facilities, outpatient facilities, medical devices, users, patients, clients, servers, specialized network devices, telephone networks, local area networks, wide-area networks, mobile networks, and the like.

In this embodiment, the plurality of hosts of the organization 102 are illustrated as one or more servers 112(1)-112(N) (hereinafter, "the servers 112") and one or more clients 114(1)-114(N) (hereinafter, "the clients 114") connected via internal network 116. In this embodiment, the internal network 116 is an intranet (i.e., a computer network that uses Internet Protocol technology to share information, operational systems, or computer services within an organization (e.g., the organization 102)). In other embodiments, the internal network 116 is a different type of network enabling communication of one or more hosts. As each of the servers 112 and the clients 114 interact with each other across the internal network 116, they generate network traffic. In this embodiment, this network traffic is referred to as network activity information.

In FIG. 1, the network activity information is illustrated by reference to the abbreviation "N.A.I." within rectangles corresponding to each of the servers 112 and the clients 114. Thus, in this embodiment, each host (i.e., the servers 112 and the clients 114) generates network activity information. In an embodiment, the network activity information corresponds to records collected from network traffic from network devices in formats, for example, Cisco System's NETFLOW v5, NETFLOW v9, Internet Protocol Flow Information Exchange, packet capture, Domain Name System (DNS) records, web proxy records, and the like.

Illustrated outside of the organization 102 is outside network 118. The outside network 118 is not part of the organization 102, but, in this embodiment, has some interaction with the internal network 116. The Internet is an example of the outside network 118 in some embodiments. Thus, in some embodiments, outside or external users may have access to the internal network 116, the servers 112, and the clients 114 that share a connection with the internal network 116.

In this embodiment, the network activity collector 136 of the segmentation environment 100 is configured to receive network activity information from the servers 112, the clients 114, hosts on the outside network 118, and any other hosts capable of producing network activity information associated with the organization 102. In this embodiment, the network activity collector 136 includes one or more network-enabled computers, such as one or more servers. In some embodiments, the one or more servers are arranged in a single location, a cluster, or across multiple locations and, in some examples, the network activity collector 136 includes one or more virtual computer instances. In this embodiment, the network activity collector 136 collects network activity information and stores the network activity information in connection with the network activity storage 138. The network activity storage 138 can include one or more databases, data storage devices, or other storage systems. For example, in some embodiments, the network activity storage 138 is a relational database. In other embodiments, the network activity storage 138 includes a graph database.

In this embodiment, the network activity analyzer 106 includes at least one memory 120 and one or more processing units (or processor(s)) 122. In some embodiments, the processor(s) 122 are implemented as appropriate in hardware, computer-executable instructions, firmware, or combinations thereof. In this embodiment, computer-executable instruction or firmware implementations of the processor(s) 122 include computer-executable or machine-executable instructions written in any suitable programming language to perform the various functions described. In some embodiments the processor(s) may be distributed among multiple physical or virtual hosts.

In this embodiment, the memory 120 includes more than one memory and can be distributed throughout many different computer devices. For example, in some embodiments, the memory 120, including its contents (e.g., segmentation module 124), is distributed throughout a cloud-computing configuration. In a cloud-computing configuration, stored on a single computer devices, or otherwise, the memory 120 stores program instructions that are loadable and executable on the processor(s) 122, as well as data generated during the execution of these programs. Depending on the configuration and type of service provider computers including the network activity analyzer 106, the memory 120 can be volatile (such as random access memory (RAM)) and/or non-volatile (such as read-only memory (ROM), flash memory, etc.). In this embodiment, the network activity analyzer 106 includes additional removable storage and/or non-removable storage including, but not limited to, magnetic storage, optical disks, 'flash' storage, and/or tape storage. In some embodiments, the disk drives and their associated computer-readable media provide non-volatile storage of computer-readable instructions, data structures, program modules, and other data for the computing devices. In some embodiments, the memory 120 includes multiple different types of memory, such as static random access memory (SRAM), dynamic random access memory (DRAM), or ROM. Turning to the contents of the memory 120 in more detail, the memory 120, in this embodiment, includes an operating system 126 and one or more application programs, modules or services for implementing the features disclosed herein including at least the segmentation module 124.

In accordance with at least one embodiment, the network activity analyzer 106 includes additional storage 128, which includes removable storage and/or non-removable storage. The additional storage 128 includes, but is not limited to, magnetic storage, optical disks, and/or tape storage. In some embodiments, the disk drives and their associated computer-readable media provide non-volatile storage of computer-readable instructions, data structures, program modules, and other data for the computing devices.

The memory 120 and the additional storage 128, both removable and non-removable, are examples of computer-readable storage media. As used with reference to embodiments described herein, modules refers to programming modules executed by computing systems (e.g., processors) that are part of the network activity analyzer 106. In this embodiment, the network activity analyzer 106 also includes input/output (I/O) device(s) and/or ports 130, such as for enabling connection with a keyboard, a mouse, a pen, a voice input device, a touch input device, a display, speakers, a printer, etc.

In accordance with at least one embodiment, the network activity analyzer 106 includes a user interface 104. The user interface 104 is utilizable by a network operator or other authorized user to access portions of the network activity analyzer 106. In some embodiments, the user interface 104 includes a graphical user interface, web-based applications, programmatic interfaces such as application programming interfaces (APIs), and the like. In other embodiments, the network operator or other authorized user accesses the network activity analyzer 106 via the user interface 104 to evaluate, manipulate, and manage the collection of network activity information.

In this embodiment, the network activity analyzer 106 also includes data store 132, including analysis storage 134. In other embodiments, the data store 132 includes more databases than the analysis storage 134. In the analysis storage 134 is stored portions of processed network activity information. For example, after network activity information is collected by the network activity collector 136 and stored in the network activity storage 138, the network activity analyzer 106 proceeds to perform one or more operations on the network activity information resulting in a change to at least a portion of the network activity information. In this example, these changed or processed portions are saved in the analysis storage 134. In another embodiment, the network activity analyzer 106 accesses the network activity analysis storage 108 to store portions of analyzed network activity information. This includes, for example, one or more observation vectors. In another embodiment, the network analyzer output 110 represents the graphs, databases, tables, and the like created when the segmentation module 124 performs one or more operations on network activity information.

Figure 2:
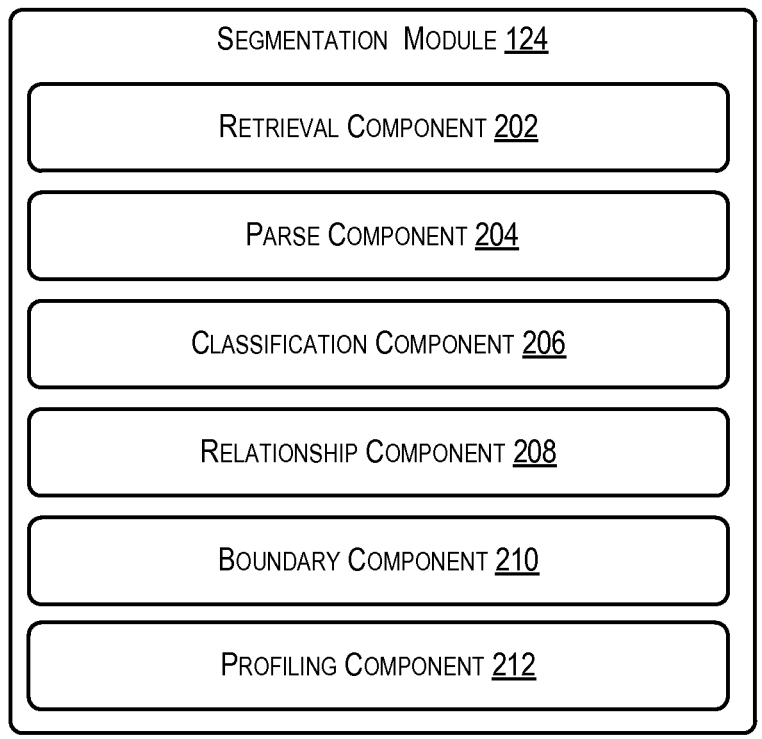
FIG. 2 illustrates an example device for implementing techniques relating to network segmentation as described herein, according to at least one embodiment.

Turning next to FIG. 2 where the segmentation module 124 of the network activity analyzer 106 is illustrated. In this embodiment, the segmentation module 124 includes a retrieval component 202, a parse component 204, a classification component 206, a relationship component 208, a boundary component 210, and a profiling component 212. While a certain number of components is illustrated, it is understood that more or less components than illustrated may be included in certain embodiments. In this embodiment, the retrieval component 202 is configured to collect or retrieve network activity information from the network activity storage 138 and/or the network activity analysis storage 108. In some embodiments, this includes performing one or more operations on the network activity information, such as, summarizing the data included in the information, creating observation vectors from the data, and storing the observation vectors in a graph database. In some embodiments, summarizing the data includes compressing certain characteristics of some hosts and using those characteristics to reduce the total amount of data. For example, if a system includes a web server that talks to 10,000 clients a day, it might not be relevant to identify all 10,000 individual clients. Instead, the retrieval component 202 can compress the information such that the remaining information simply recognizes that the web server talks to 10,000 clients (without identifying each individual client). In some embodiments, an example observation vector has N number of dimensions, where N is any real number between 1 and infinity. In this embodiment, an example observation vector has between 5-15 dimensions, with each dimension representing a characteristic, a metric, or dimension of a particular host or host pairing.

In this embodiment, the retrieval component 202 is configured to store network activity information and/or observation vectors in connection with the network activity analysis storage 108 and/or the data store 132. In this manner, the network activity information and related observation vectors are readily available for additional processing by other components of the segmentation module 124. In some embodiments, the retrieval component 202 is configured to query other applications (not shown) to retrieve network activity information. These queries and/or direct retrieval by the retrieval component 202 of network activity information can take place according to a retrieval schedule. For example, in an embodiment, the retrieval component 202 collects network activity information periodically (e.g., hourly, daily, weekly, monthly, yearly, etc., and any combination of the foregoing) based on the retrieval schedule.

Turning next to the parse component 204, in this embodiment, the parse component 204 is configured to perform one or more searches to identify hosts in the network activity analysis storage 108 (e.g., the clients 114 and the servers 112) based on certain criteria of network activity information. In some examples, the criteria include one or more metrics identifiable from network activity information that describe the interactions of the hosts of the internal network 116 or other applications as noted above. Once the parse component 204 identifies hosts matching the criteria from the storage, the parse component 204 is configured to add identified hosts to a graph and export the resulting sub-graph (as a flat file, database records, program object, or the like). The graph is stored in connection with the network activity analyzer 106. In this embodiment, each node, or host, is represented by an observation vector and the collected network activity information is a dimension of the observation vector. In some embodiments, this sub-graph will be used by other components of the segmentation module 124 in implementing the techniques described herein.

Turning next to the classification component 206, in this embodiment, the classification component 206 is configured to perform one or more operations, including, creating clusters from the observation vectors. The creation of clusters from the observation vectors is a way to organize and/or group similar hosts, primarily those of the internal network 116 but also potentially including those of the outside network 118. In some embodiments, the classification component 206 creates clusters using a clustering technique utilizing a single, or a combination of, any suitable clustering algorithms. Examples of suitable clustering algorithms include, k-means clustering, hierarchal clustering, expectation maximization clustering, and self-organizing maps. In some embodiments, the component provides a pre-defined number of clusters (e.g., 10) in connection with a user input, and the classification component 206 generates clusters according to the pre-defined number. In other embodiments, the number of clusters is not defined. In this embodiment, after generating the clusters, the classification component 206 determines a centroid for each generated cluster, and determines a distortion for each of the generated cluster. The classification component 206 then exports the results to a table, such as host table 402 of FIG. 4, that includes hosts, observation vectors (i.e., the dimensions of each observation vector), clusters, and distortion. In some embodiments, the classification component 206 also outputs a graph with the cluster values stores per host.

Turning next to the relationship component 208, in this embodiment, the relationship component 208 is configured to access the output (e.g., table and graph) from the classification component 206 and create a relationship graph. In this embodiment, the relationship graph is a graph showing relationships between clusters based on the hosts in the individual cluster. In this embodiment, this is accomplished by recording host pair observation vectors as a relationship in a graph between the clusters the hosts belong to. In this manner, the relationship component 208 further defines the relationships of the clusters within the internal network 116. In some embodiments, the relationship component 208 accesses other information in addition to the output from the classification component 206. In one example, this additional information is similar to the output information and may include, for example, cluster information, host identity information, and network activity information. Based in part on this additional information and/or the output information, in one embodiment, the relationship component 208 generates a cluster relationship graph.

Turning next to the boundary component 210, in this embodiment, the boundary component 210 is configured to create a host profile for hosts of the internal network 116. In this embodiment, the host profile profiles based on a particular host, its current peers, its cluster, and the cluster's expected relationships (as identified by the relationship component 208). The host profile can have different levels of granularity depending on a particular profile. For example, in one embodiment, the host profile is at a high level indicating the type of host the profiled host is likely to talk to. In another embodiment, the host profile is at a lower level indicating IP address and/or port identification where communications are expected. In this manner, the boundary component 210 enables a network operator or other authorized user to understand the makeup of the organization 102, identify related systems, and identify boundaries between groups of related systems.

Turning next to the profiling component 212, in this embodiment, the profiling component 212 is configured to determine one or more segments or enclaves based on the data and information processed by other components of the segmentation module 124. In some embodiments, the profiling component 212 determines and maintains profiles for hosts of the internal network 116. As part of a monitoring process, the profiling component 212 identifies when a particular host is acting outside of its profile. In some embodiments, this is a product of malicious activity (i.e., taking over the host and making it perform other operations). In other embodiments, when the particular host is considered compromised, it should be removed from the system or handled by network security professionals. In some embodiments, the profiling component 212 generates a list of hosts acting outside of their respective profiles. The list, in one embodiment, is prioritized based on any one of a number of factors. For example, a prioritization factor can include change in transfer of bytes, change in number of requests, type of host (e.g., database server, user terminal, mobile device, and telemetry), criticality of host to overall network, etc.

In another embodiment, the profiling component 212 is configured to profile user interaction using information provided and/or generated the network activity collector 136. For example, the profiling component 212 creates a client profile by converting the user's temporal interactions (i.e., Network Activity Information) with the internal network 116 to a state machine. In this embodiment, each host that the user's network profile and/or user visit is treated as a state. Particular states and their order can be tracked for each user (i.e., path from one state to the next). Thus, the profiling component 212, in this embodiment, creates a state machine indicative of the user's interactions with hosts of the internal network 116 and outside network 118. Based on the state machine, the profiling component 212 determines a client profile describing each state (i.e., probability of the next state change based on the current state, etc.). In this embodiment, the profiling component 212 then monitors the state changes of the user. This monitoring and client profile can be useful to determine when the user and/or the host(s) have been compromised or are being used for malicious purposes, for example, when the user acts outside of the client profile for a number of states. In some embodiments, the profiling component 212 or other component is configured to generate an alert, create an event, or notify a network operator or other authorized user of the suspicious activity.

Figure 3:
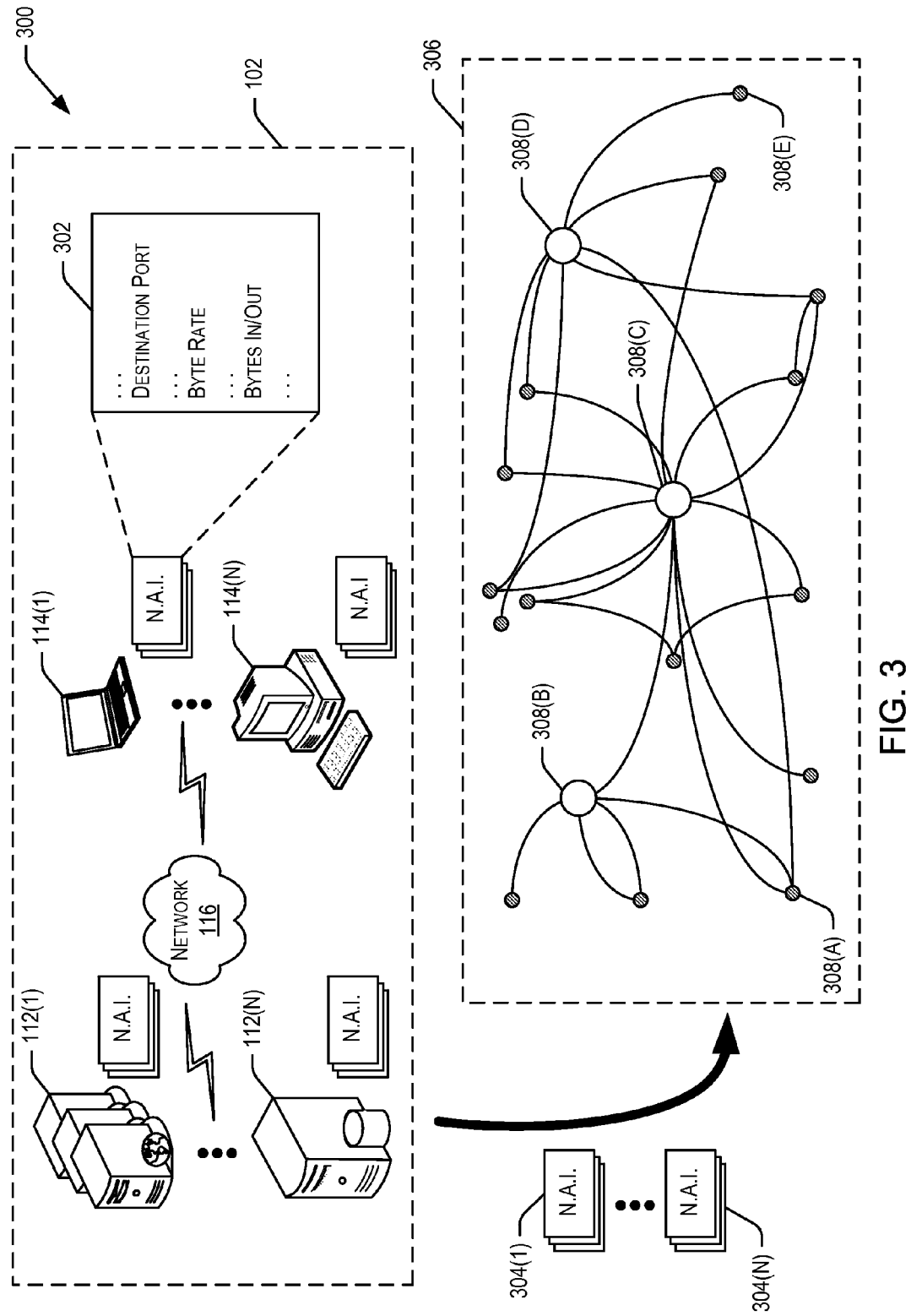
FIG. 3 illustrates an example diagram depicting a portion of a process for implementing techniques relating to network segmentation as described herein, according to at least one embodiment.

Turning next to FIG. 3, where process 300 is illustrated. In this embodiment, the process 300 describes techniques for network segmentation as described herein. The process 300 illustrates the organization 102 which includes a plurality of hosts (i.e., the servers 112 and the clients 114) connected via the internal network 116 and accessible via the outside network 118. In this embodiment, the servers 112 include an example web server 112(1) and an example database server 112(N) and the clients 114 include an example laptop client 114(1) and an example desktop client 114(N). As would be understood by one of ordinary skill in the art, the servers 112 and the clients 114 can be any suitable server or client capable of connecting to the internal network 116. In some embodiments, the servers 112 and the clients 114 are included in one device that acts both like a client and like a server. In some embodiments, whether a particular host is a client or a server depends on its characteristics within the organization 102 and not necessarily whether it is defined as such previously. Examples of the servers 112 include, for example, web servers, database servers, infrastructure, application servers, catalog servers, communications servers, file servers, mail servers, payment processing servers, medical record servers, mobile servers, name servers, print servers, proxy servers, sound servers, and the like. In accordance with at least one embodiment, the servers 112 include specialized servers capable of handling protected health information (PHI) including one or more divisions between PHI and non-PHI. In some embodiments, the servers 112 operate and/or control medical device systems. Examples of the clients 114 include, for example, medical devices (including those with access to PHI and those without access to PHI), telemetry systems, reverse proxies, industrial control systems, handheld communication devices (e.g., cell phones, tablets, scanners, radios, smartphones, etc.), laptops, workstations, personal computers, and the like.

As illustrated in FIG. 1, each of the servers 112 and the clients 114 are illustrated in FIG. 3 with accompanying network activity information (i.e., N.A.I. within rectangular). The network activity information associated with the client 114(1) is shown in box 302. The network activity information may include the following for hosts of the organization 102: source IP address, destination IP address, source port, destination port, byte rate, byte total input, interface index used by simple network management protocol (SNMP); output interface index or zero if the packet is dropped; timestamps for the flow start and finish time since the last boot; number of bytes and packets observed in the flow; layer 3 headers, including, source and destination IP addresses, source and destination port numbers for transmission control protocol (TCP), user datagram protocol (UDP), stream control transmission protocol (SCTP), internet control message protocol (ICMP), type and code, IP protocol, type of service (ToS) value; for TCP flows, the union of all TCP flags observed over the life of the flow; and layer 3 routing information, including, IP address of the immediate next-hop along the route to the destination, and source and destination IP masks; ingress interface; source IP address; destination IP address; IP protocol; source port for UDP or TCP; destination port for UDP or TCP, type and code for ICMP, or 0 for other protocols; IP ToS; Uniform Resource Identifiers; Uniform Resource Locators; and Uniform Resource Names.

Using the techniques described herein, the network activity analyzer 106 collects network activity information 304(1)-304(N) (hereinafter, "the network activity information 304"). In one embodiment, the network activity information 304 represents network activity information on a per host basis over a time period. In another embodiment, the network activity information 304 represents a portion of the total network activity information generated by the hosts of the organization 102.

Using techniques described herein, the network activity information 304 is used by the network activity analyzer 106 to develop network graph 306. In this embodiment, the network graph 306 includes a plurality of nodes each representing a host of the organization 102 and their communications with a data center of the organization 102. The network graph 306 includes example nodes 308(A)-308(E). The lines between the nodes, including the example nodes 308(A)-308(E), represent paths of data between the nodes. In one embodiment, the example node 308(A) communicated at one time with the example node 308(B), the example node 308(C), and the example node 308(D), but not the example node 308(E). In this embodiment, such information is helpful to identify which nodes communicate with which other nodes. In some embodiments, each of the example nodes 308(A)-308(E) represents a different system of the organization 102. For example, in this embodiment, the example node 308(A) represents communications of Extract, Transform, and Load (ETL) of hosts, the example node 308(B) represents telemetry systems, the example node 308(C) represents web servers, the example node 308(D) represents infrastructure services, and the example node 308(E) represents database servers. Using the techniques described herein, the network graph 306 is exported, (to a flat file, database records, or the like), for example, by the segmentation module 124 and used to segment the organization 102.

Figure 4:
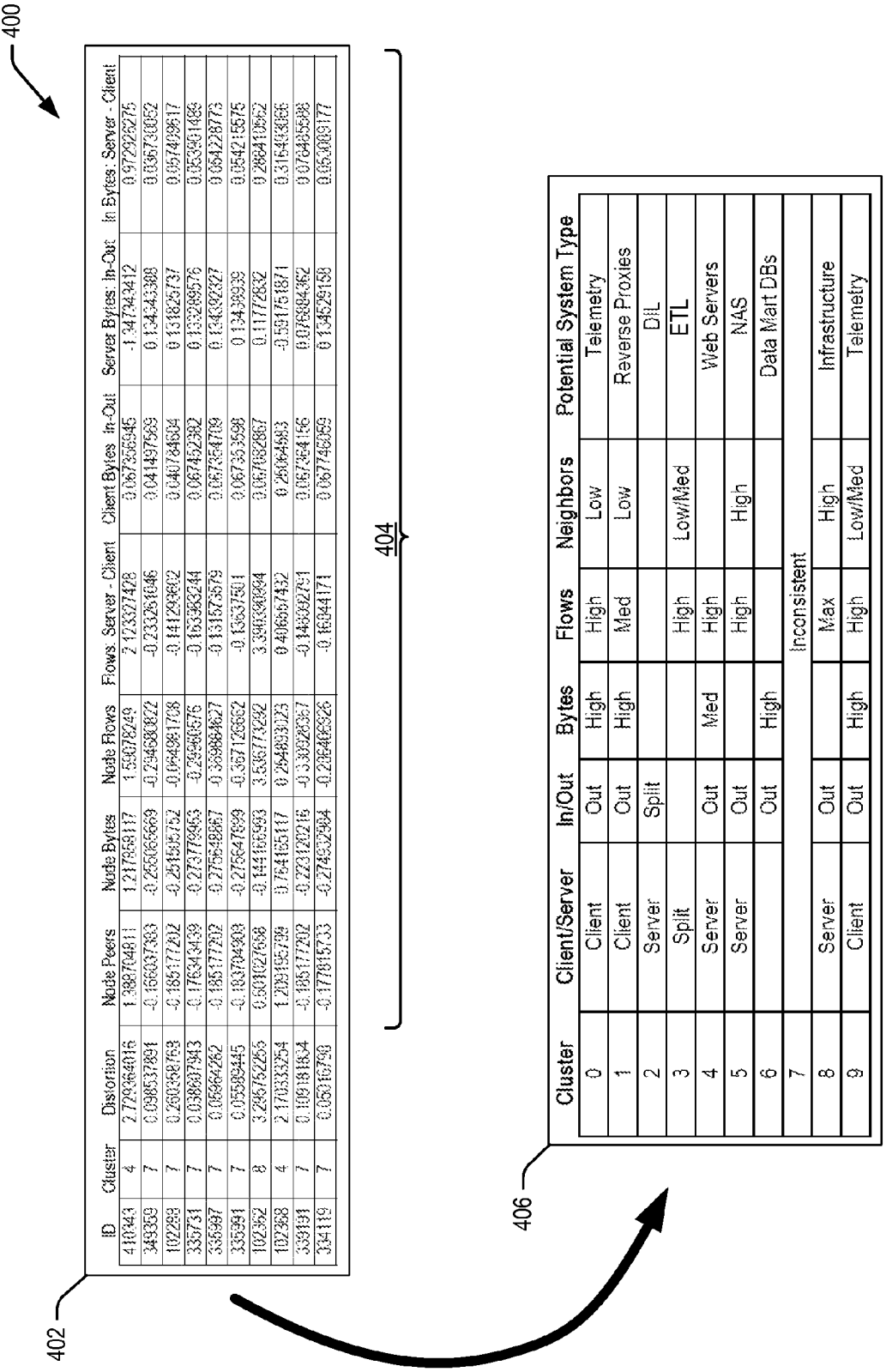
FIG. 4 illustrates an example diagram depicting a portion of a process for implementing techniques relating to network segmentation as described herein, according to at least one embodiment.

Turning next to FIG. 4, in FIG. 4 process 400 is illustrated. In this embodiment the process 400 is a continuation of the process 300 discussed with reference to FIG. 3. In other embodiments, the process 300 and the process 400 are carried out in parallel. In either case, each is distinct. In this embodiment, the process 400 includes techniques relating to network segmentation as described herein. An example technique involves the creation of host table 402. In some embodiments, the host table 402 is created manually. In this embodiment, the host table 402 is created automatically using the techniques described herein. The host table 402 includes an ID column, a cluster column, a distortion column, and observation vector columns 404. In other embodiments, the inclusion of the distortion column will depend on whether a particular clustering algorithm accounts for and/or creates distortion. Thus, some clustering algorithms do not create distortion. In this embodiment, the numbers in the ID column uniquely identify a host of the organization 102. The cluster columns identify to which cluster a particular host of the organization 102 belongs as determined by the classification component 206. The distortion column includes a calculated distortion result for each particular host of the organization 102. The distortion represents the variance of the host from the rest of the cluster it belongs to. In this embodiment, the observation vector columns 404 include seven distinct columns to represent seven different dimensions included in each observation. Thus, the observation vectors included in the host table 402 are seven dimension observation vectors. In other embodiments, more or less dimensions can be included.

An additional technique is illustrated by comparison table 406. In some embodiments, the comparison table 406 is created automatically. In other embodiments, the comparison table 406 is created at least in part manually. In this embodiment, the comparison table 406 illustrates predictions of potential system type based on the characteristics of hosts which comprise the potential systems and the clusters to which the hosts belong. Thus, in this embodiment, for cluster 0, its client/server designation is "client"—meaning it acts most like a client, its in/out designation is "out"—meaning that most data flows out, its bytes designation is "high"—meaning it communicates a relative high number of bytes, its flows designation is "high"—meaning the number of flows is relatively high, its neighbors are "low," and based on this information, its potential system type is a "telemetry system." For each remaining cluster a corresponding potential system type is designated. In other embodiments, more or fewer clusters and thus more or fewer potential system types will be designated. In some embodiments, discovering the potential system type enables a network operator or other authorized user to make one or more changes to the organization 102 to achieve its goals of segmentation.

Figure 5:
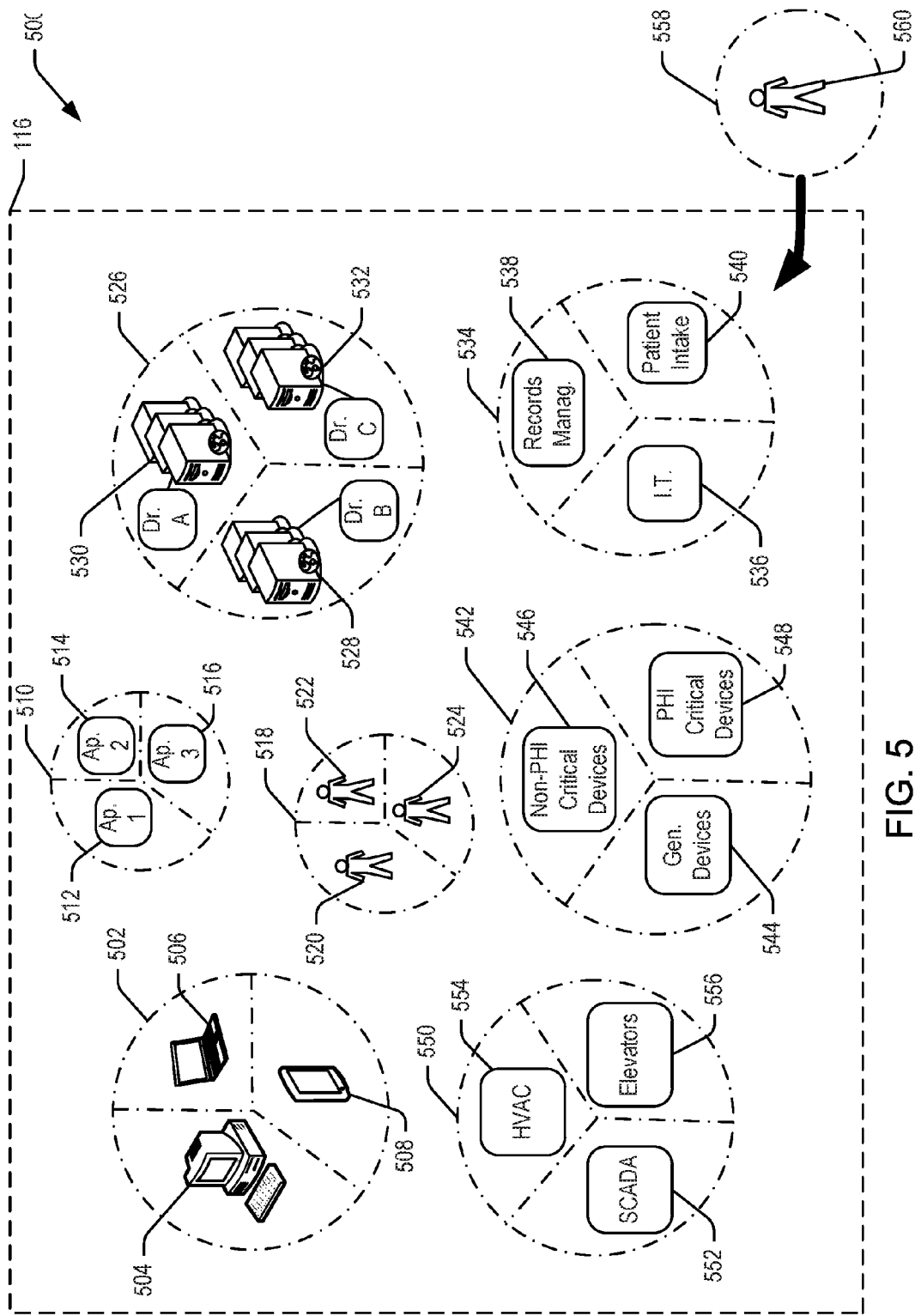
FIG. 5 illustrates example segments of a network segmented using techniques relating to network segmentation as described herein, according to at least one embodiment.

Turning now to an embodiment wherein the organization 102 is segmented. FIG. 5 illustrates, in accordance with this embodiment, segmented network 500. The segmented network 500 is an example of the organization 102 after performance of the techniques described herein. In this embodiment, the segmented network 500 includes the internal network 116. In other words, the items within the internal network 116 communicate via the internal network 116. The internal network 116 includes a plurality of segments or enclaves (i.e., divisions within the internal network 116 which, in some examples, are achieved via firewalls). In this embodiment, included among the plurality of segments of the internal network 116 are: device segment 502, including devices, 504, 506, and 508; application segment 510, including applications 512, 514, and 516; user segment 518, including users 520, 522, and 524; clinic segment 530, including clinics 528, 526, and 532; department segment 534, including departments 536, 538, and 540; medical device segments 542, including medical devices 544, 546, and 548; and control system segments 550, including control systems 552, 554, and 556.

In other embodiments, the segments of the internal network 116 include: building segments (including various systems within a building), compliance segments (including systems with a specific compliance requirement (e.g., PHI)), logical segments (including systems which are connected in the same logical subnet or classless inter-domain routing (CIDR) block), high impact segments (including systems of the same (high) impact to the company if compromised), and high risk segments (including systems that have the same (high) risk of being compromised). The segmented network 500 also includes outside segment 558, including outside user 560. While a certain number of segments are illustrated, a person of ordinary skill in the art would understand that, using the techniques described herein, any suitable number of segments can be developed. Moreover, segments can divided up into one or more sub-segments. In one example, a sub-segment includes one or more hosts. In some embodiments, segments and sub-segments are not mutually exclusive. Thus, a particular segment or sub-segment can reside in multiple other segments or sub-segments along with segments or sub-segments. In this manner, the internal network 116 is segmented according to the particular needs of the network operator and with respect to the demands of the organization associated with the internal network 116. For example, as discussed with reference to FIG. 6, a medical organization discriminates between hosts with access to PHI and those without access to PHI. In other organizations which do not handle PHI, such a distinction may not be relevant.

Referring first to the device segment 502, in this embodiment, the device segment 502 is its own segment within the internal network 116 and each of the devices 504, 506, and 508 are within their own segments within the device segment 502. In this embodiment, each of the devices 504, 506, and 508 represent a particular class, type, division, or the like of device that is utilizable to access different files within the internal network 116. For example, in one embodiment, the device 504 represents patient intake computers, the device 506 is used by nurses at a nurses' station, and the device 508 represents a mobile phone of doctor that has access to the internal network 116. Thus, in this embodiment, the privileges or access of the devices 504, 506, and 508 can be limited to the definition of the device segment 502 using the techniques described herein. Turning next to the application segment 510, in this embodiment, the application segment 510 is its own segment within the internal network 116 and each of the applications 512, 514, and 516 are within their own segments within the application segment 510. In this embodiment, each of the applications 512, 514, and 516 have access to different hosts within the internal network 116 and have different numbers of users. For example, in one embodiment, the application 512 is used by thousands of different hosts each day, the application 514 is very specialized and used by only a few hosts each day, and application 516 is a general tool used by a very large number of hosts each day. Thus, in this embodiment, the privileges or access of the applications 512, 514, and 516 can be limited to the definition of the application segment 510 using the techniques described herein. Turning next to the user segment 518, in this embodiment, the user segment 518 is its own segment within the internal network 116 and each of the users 520, 522, and 524 are within their own segments within the user segment 518. In some embodiments, the users 520, 522, and 524 are divided up based on title or privileges within the organization 102. For example, in one embodiment, the users 520 are interns, while the users 522 are doctors, and the users 524 are management professionals. Thus, in this embodiment, the privileges or access of the users 520, 522, and 524 can be limited to the definition of the user segment 518 using the techniques described herein.

Turning next to the clinic segment 526, in this embodiment, the clinic segment 526 is its own segment within the internal network 116 and each of the clinics 528, 530, and 532 are within their own segments within the clinic segment 526. In accordance with at least one embodiment, each of the clinics 528, 530, and 532 provide medical services to different patients. Within the hosts operating within each of the clinics 528, 530, and 532 is stored PHI for different patients. PHI, unlike other types of information, is to be stored apart from other information and de-identified before being shared in certain circumstances. Thus, in this embodiment, the privileges or access of the clinics 528, 530, and 532 can be limited to the definition of the clinic segment 526 using the techniques described herein. Turning next to the department segment 534, in this embodiment, the department segment 534 is its own segment within the internal network 116 and each of the departments 536, 538, and 540 are within their own segments within the department segment 534. In this embodiment, each of the departments 536, 538, and 540 have different network and access needs. For example, in one embodiment, the department 536 is an IT support department and needs access to almost all hosts on the internal network 116, while the department 538 is a records management department and ought to be configured to store medical record information in a safe manner that limits who can input and export information and the department 540 is a patient intake department with network needs different than the other departments. Thus, in this embodiment, the privileges or access of the departments 536, 538, and 540 can be limited to the definition of the department segment 534 using the techniques described herein.

Turning next to the medical device segment 542, in this embodiment, the medical device segment 542 is its own segment within the internal network 116 and each of the medical devices 544, 546, and 548 are within their own segments within the medical device segment 542. In this embodiment, each of the medical devices 544, 546, and 548 have different network and access needs. For example, in one embodiment, the medical device 544 includes general medical devices and therefore has broader network access, the medical device 548 includes PHI-critical medical devices and therefore has limitations on who can read and write data located on the PHI-critical medical devices, and the medical device 546 includes Non-PHI critical medical devices and therefore likely has less limitations on who can read and write data located on the Non-PHI critical medical devices. Thus, in this embodiment, the privileges or access of the medical devices 544, 546, and 548 can be limited to the definition of the medical device segment 542 using the techniques described herein.

Turning next to the control system segment 550, in this embodiment, the control system segment 550 is its own segment within the internal network 116 and each of the control systems 552, 554, and 556 are within their own segments within the control system segment 550. In this embodiment, each of the control systems 552, 554, and 556 have different network and access needs. For example, in one embodiment, the control system 552 includes supervisory control and data acquisition (SCADA) systems and therefore communicates with a limited number of hosts relating to SCADA control, the control system 554 includes heating, ventilation, and air conditioning (HVAC) systems and therefore communicates with a limited number of hosts relating to the HVAC systems, and the control system 556 includes elevator system which is limited to communications with other elevator control systems. Thus, in this embodiment, the privileges or access of the control systems 552, 554, and 556 can be limited to the definition of the control system segment 550 using the techniques described herein. Finally turning to the outside segment 558, in this embodiment, the outside segment 558 defines access to network hosts for the outside user 560 as the outside user 560 access the internal network 116. Other segments are possible beyond those illustrated.

In one embodiment, the metrics and observation vectors which define segments are not generated by the organization but are instead received from one or more other organizations which have previously received or generated them. In this embodiment, segments are shared between organizations as metrics and observation vectors. In another embodiment, the organization shares their segments with other organizations. In this embodiment, the sharing organization may, but is not required to, receive feedback on their segments which may be used to improve the profile.

Figure 6:
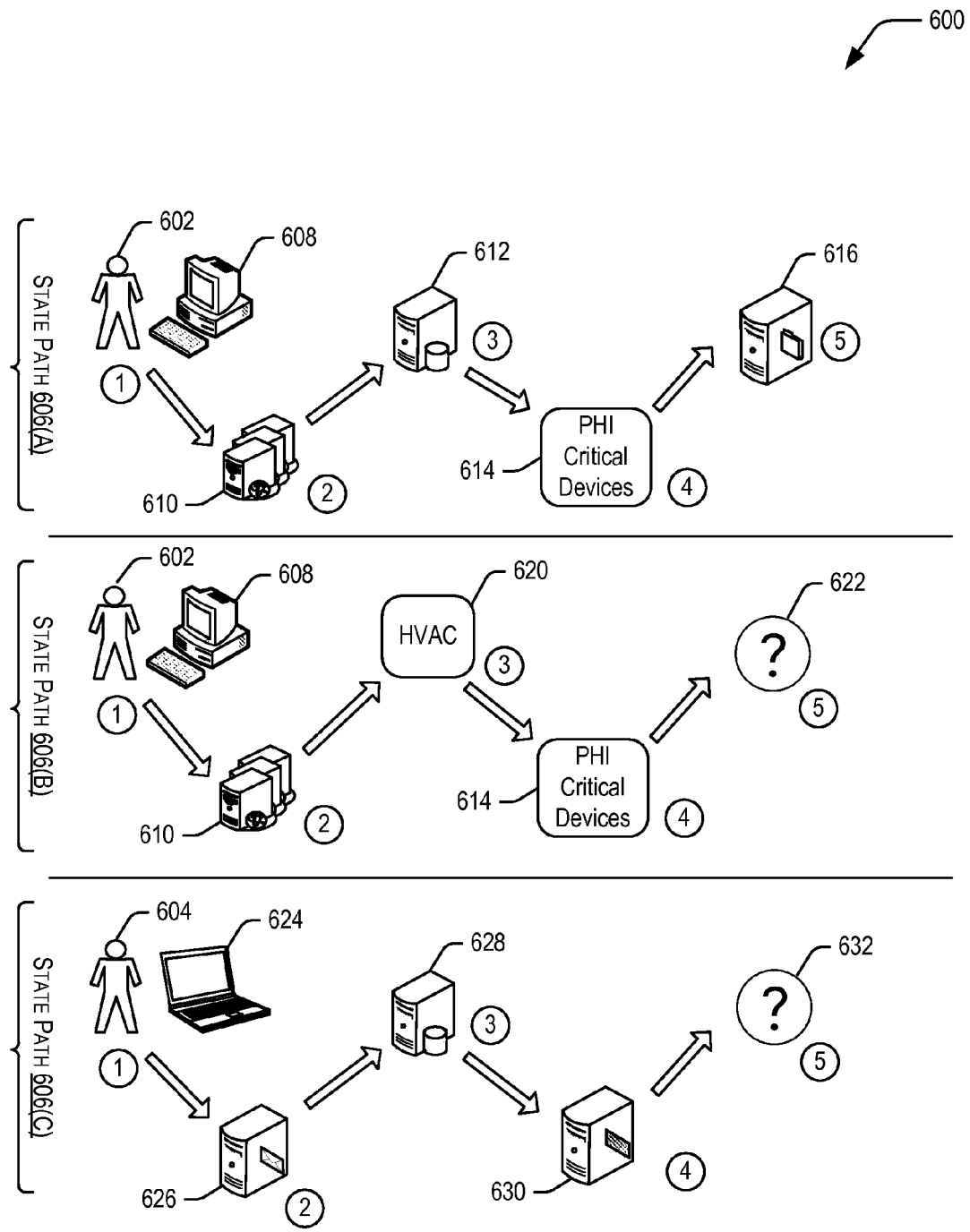
FIG. 6 illustrates an example diagram depicting state paths identified using techniques relating to network segmentation as described herein, according to at least one embodiment.

Referring to FIG. 6, a path chart 600 is illustrated for implementing the techniques described herein according to at least one embodiment. In this embodiment, a client profile (i.e., order and visits to hosts) of known client host 602 are tracked on state path 606(A) and state path 606(B) and a client profile of suspicious client host 604 is tracked on state path 606(C). In this embodiment, the client profile for the known client host 602 is tracked and predicted using techniques similar to a Markov chain. Thus, in some examples, a subsequent state depends on the current state and a probabilistic determination. In this embodiment, for the state paths 606(A) and 606(B), each number (i.e., 1-5) represents a visited host of the known client host 602; the same is true respectively for the suspicious client host 604. The state path 606(A) illustrates an example path of the known client host 602. In at least one embodiment, the state path 606(A) is developed based on network activity information specific for the known client host 602 and each step (i.e., 1-5) represents a state in a state machine. Thus, the client is the known client host 602 because the known client host 602 has developed network activity information. In this embodiment, each step from 1-5 of the known client host 602 along the state path 606(A) is representative of a state in a state machine and the known client host's 602 path is tracked. The state path 606(A) is an example of a known state path or a probable state path. In other words, based on prior interactions of the known client host 602, the state path 606(A) has been developed based on the known client host's 602 probable path of visiting the hosts. The known client host 602, in an example embodiment, is an office computer of a doctor who upon arrival to a hospital each morning often follows the path of first logging on to his office computer 608 (step 1), checking the news online (access webserver 610 at step 2), accessing a patient file in a database server 612 (step 3), tending to a patient on a PHI-critical device (e.g., a dialysis machine 614 (step 4)), and finally saving a file on a file server 616 (step 5). In this manner, the system can track the interactions of the known client host 602 as states in a state machine and predict its future interactions.

In one embodiment, client profiles are not generated by the organization but are instead received from one or more other organizations (e.g., network analysis organizations, consulting organizations, network security organizations, and the like) which have previously received or generated them. In this embodiment, state profiles are shared between organizations. In another embodiment, the organization shares its state profiles with other organizations. In this embodiment, the sharing organization may, but is not required to, receive feedback on its profiles which may be used to improve the profiles. In this manner, the state profiles are shareable with other organizations. The other organizations which, in some embodiments, share state profiles provide periodic updates to the state profiles. Thus, as the state profiles change and evolve over time, the organization receives updated state profiles. These updated state profiles are useable to by the organization and other organizations to identify systems of the network. In an embodiment, a third party receives network activity information for hosts operating on a first party's network. According to the techniques described herein, the third party analyzes the network activity information and creates one or more state profiles. These state profiles, while specific to the first party's network, may also be generally applicable to other networks. Thus, in this embodiment, the third party shares the state profiles with a different party. In some examples, this results in a quicker identification of the systems and components of the network, and ultimately to segmentation of the different party's network.

In this embodiment, the state path 606(B) is an example where the known client host 602 deviates from his typical path (i.e., typical state change order, such as, the state path 606(A)). In this example, the known client host 602 visits HVAC control system 620 (step 3) instead of the known user's 602 probable visit to the database server 612 at step 2, as illustrated in the state path 606(A). If the state changes of the known client host 602 get too far from the probable path, then the system can flag the user and/or the user's profile as having possibly been compromised or being used for malicious purposes. Referring now to the state path 606(C), this path represents a probable client profile for the suspicious client host 604. In this embodiment, the state path 606(C) represents the probable path of the suspicious client host 604 who may be entering the system for malicious purposes. When a new user or existing user begins to have a client profile similar to the one represented by the state path 606(C), the system can notify an operator or other authorized user to investigate the user whose path is similar to the state path 606 (*c*). In this manner, state change information can be used to identify suspicious client hosts.

Figure 7:
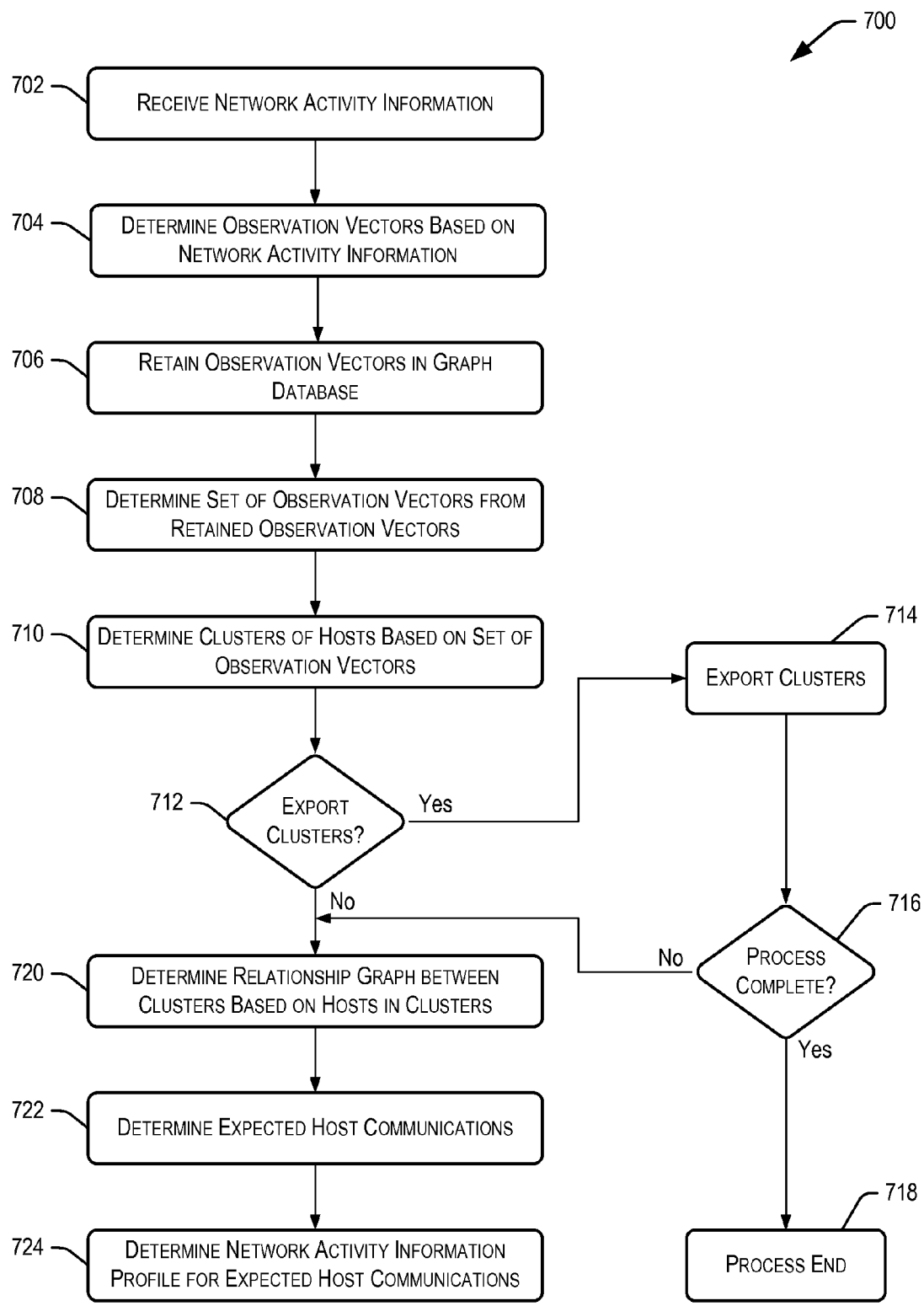
FIG. 7 illustrates a flow diagram depicting example acts for implementing techniques relating to network segmentation as described herein, according to at least one embodiment.

FIG. 7 depicts an illustrative flow diagram showing process 700 for segmenting a medical network according to at least one example. In this illustrative flow diagram, the network activity analyzer 106 (FIG. 1) of the segmentation environment 100 (FIG. 1) performs the process 700 of FIG. 7. The process 700 begins at block 702 by receiving network activity information. In at least one embodiment, receiving network activity information also includes compressing network activity information. At block 704, the process 700 determines observation vectors based on network activity information. At block 706, the process 700 retains observation vectors in a graph database. At block 708, the process 700 determines sets of observation vectors from retained observation vectors. In at least one embodiment, determining sets of observation vectors includes identifying hosts based on network criteria, including hosts that match based on the criteria in a graph, and/or determining a flat file based in part on the graph. At block 710, the process 700 determines clusters of hosts based on set of observation vectors. In at least one embodiment, determining clusters of hosts includes determining clusters of similar hosts, determining centroids of clusters, determining distortion of clusters, determining a host table including at least host ID, cluster ID, and observation vector, and determining a graph with cluster values associated with hosts. At decision block 712, the process 700 determines whether to export clusters. If yes, then at block 714, the process 700 exports clusters. At decision block 716, the process 700 determines whether the process is complete. If yes, then at block 718, the process ends. If no, then the process 700 continues as if "no" had been selected at decision block 712. At block 720, the process 700 determines relationship graphs between clusters based on hosts in clusters. In at least one embodiment, determining relationship graphs includes identifying hosts of individual clusters and determining relationship graphs based on hosts. At block 722, the process 700 determines expected hosts communications. In at least one embodiment, determining expected hosts includes identifying hosts, identifying peer hosts, and identifying clusters and determining expected relationships within the clusters. At block 724, the process 700 determines network activity information profile for expected host communications. In at least one embodiment, determining network activity information profile includes determining a network activity information profile for expected relationships and retaining observation vectors in a graph database.

Figure 8:
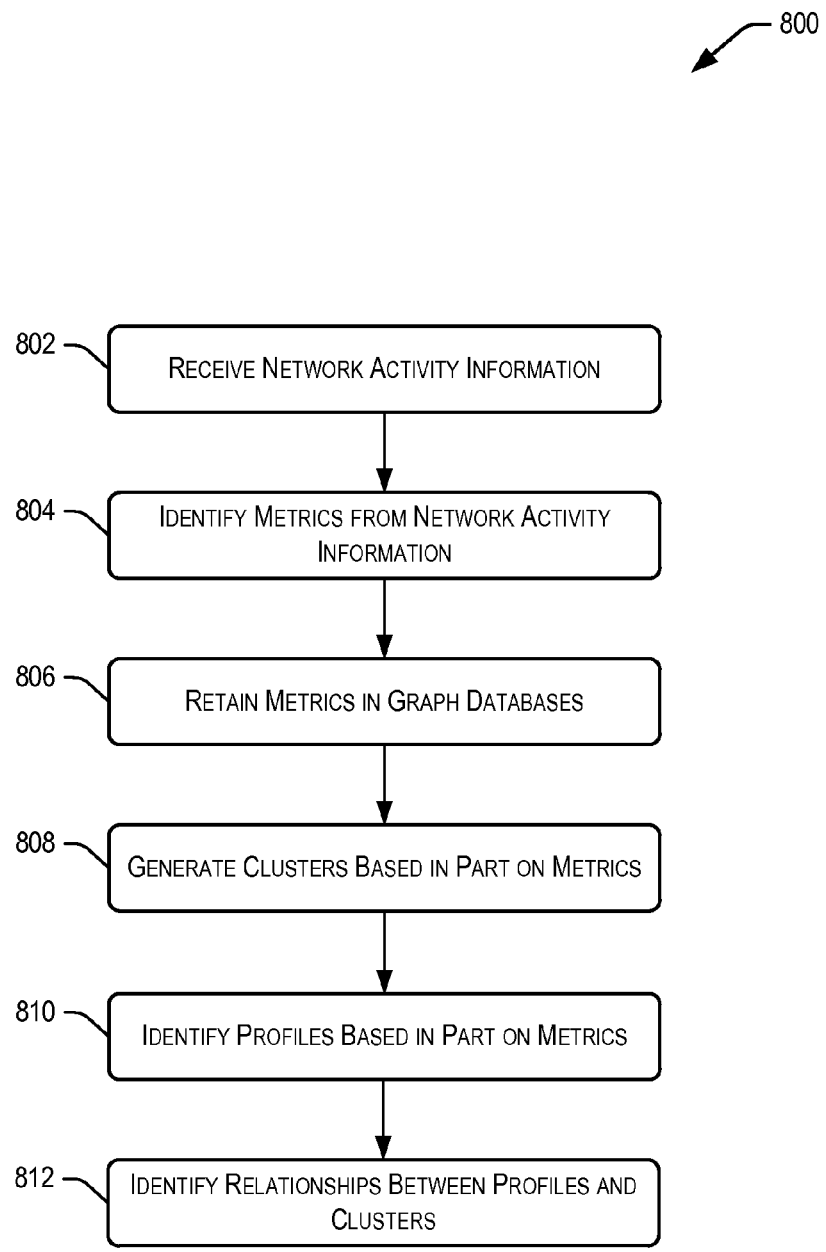
FIG. 8 illustrates a flow diagram depicting example acts for implementing techniques relating to network segmentation as described herein, according to at least one embodiment.

FIG. 8 depicts an illustrative flow diagram showing process 800 for segmenting a medical network according to at least one example. In this illustrative flow diagram, the network activity analyzer 106 (FIG. 1) of the segmentation environment 100 (FIG. 1) performs the process 800 of FIG. 8. The process 800 begins at block 802 by receiving network activity information. At block 804, the process 800 identifies metrics from network activity information. At block 806, the process 800 retains metrics in graph databases. At block 808, the process 800 generates clusters based in part on metrics. At block 810, the process 800 identifies profiles based in part on metrics. At block 812, the process 800 identifies relationships between profiles and clusters.

Figure 9:
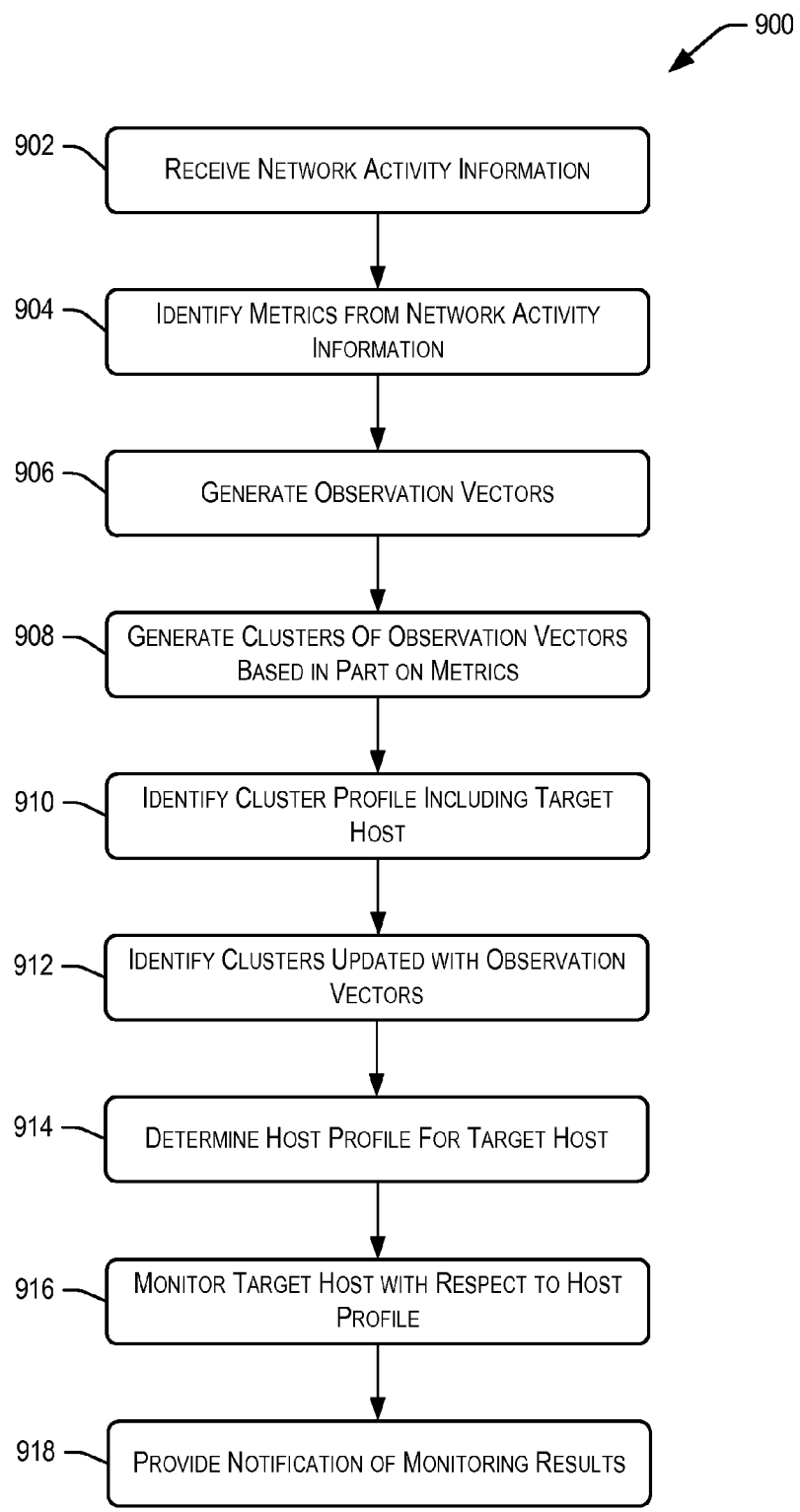
FIG. 9 illustrates a flow diagram depicting example acts for implementing techniques relating to network segmentation as described herein, according to at least one embodiment.

FIG. 9 depicts an illustrative flow diagram showing process 900 for identifying a compromised host according to at least one example. In this example, clusters and associated centroids have previously been calculated. In this illustrative flow diagram, the network activity analyzer 106 (FIG. 1) of the segmentation environment 100 (FIG. 1) performs the process 900 of FIG. 9. The process 900 begins at block 902 by receiving network activity information. At block 904, the process 900 identifies metrics from the network activity information. In at least one embodiment, identifying metrics includes identifying one or more metrics identifying relationships between hosts generating the network activity information. At block 906, the process 900 generates observation vectors. In at least one embodiment, the observation vectors include more than one dimension. At block 908, the process 900 generates clusters of observation vectors based in part on the metrics. In at least one embodiment, generating clusters of observation vectors includes generating according to one or more clustering techniques utilizing one or more clustering algorithms. At block 910, the process 900 identifies a cluster profile including a target host. In at least one embodiment, identifying the cluster profile includes identifying the cluster profile when the target host is associated with a particular cluster. At block 912, the process 900 identifies clusters updated with host observation vectors. At block 914, the process 900 determines a host profile for target host. In at least one embodiment, determining a host profile includes comparing the cluster profile and a subset of network activity information for the target host. At block 916, the process 900 monitors a target host with respect to the host profile. At block 918, the process 900 provides notifications of monitoring results. In at least one embodiment, the process provides notifications to a network operator or other authorized user. In another embodiment, the process provides notification to a component of the network activity analyzer 106.

Figure 10:
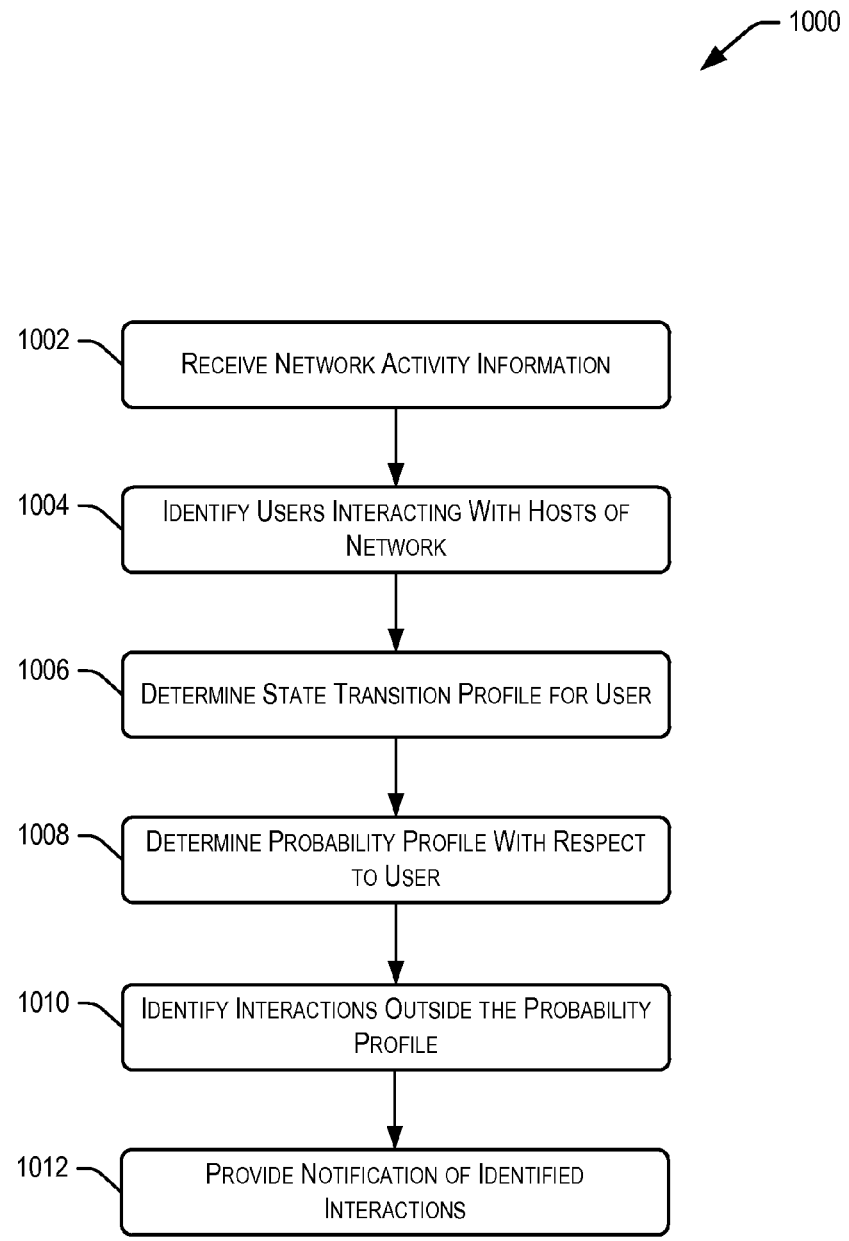
FIG. 10 illustrates a flow diagram depicting example acts for implementing techniques relating to network segmentation as described herein, according to at least one embodiment.

FIG. 10 depicts an illustrative flow diagram showing process 1000 for identifying a compromised user profile using state transitions according to at least one example. In this illustrative flow diagram, the network activity analyzer 106 (FIG. 1) of the organization 102 (FIG. 1) performs the process 1000 of FIG. 10. The process 1000 begins at block 1002 by receiving network activity information. At block 1004, the process 1000 identifies users interacting with hosts of the network. At block 1006, the process 1000 determines a client profile for the user. In at least one embodiment, determining a client profile includes identifying network activity information corresponding to interactions of the user with hosts of the network. At block 1008, the process 1000 determines a client profile with respect to the user. In at least one embodiment, determining the client profile includes considering a portion of the client profile, such as, a probability profile. The client profile includes predictions that the user will interact with a first host of the hosts. At block 1010, the process 1000 identifies interactions outside the client profile. In at least one embodiment, interactions outside the client profile include interactions with hosts of the network for which their probability is within a threshold. At block 1012, the process 1000 provides notifications of identified interactions. In at least one embodiment, this includes providing notifications to a network operator or other authorized user. In another embodiment, the process provides notifications to a component of the network activity analyzer 106.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for automatically generating segments in a medical provider network, the system comprising:
   a plurality of hosts configured to generate network activity information, at least a portion of the hosts belonging to a medical provider organization and connected via the medical provider network; and
   an analyzer server configured to analyze the network activity information, the analyzer server comprising:
   memory that stores computer-executable instructions; and
   at least one processor configured to access the memory and execute the computer-executable instructions to at least:
   receive a portion of the network activity information collected during an observation period, the portion of the network activity information describing interactions of the plurality of hosts of a first medical system and a second medical system on the medical provider network during the observation period;
   identify one or more metrics based in part on at least the portion of the network activity information, the one or more metrics identifying relationships between hosts of the plurality of hosts;
   determine a plurality of observation vectors based at least in part on the one or more metrics, individual observation vectors of the plurality comprising one or more dimensions and representing individual hosts of the plurality of hosts;
   generate a plurality of clusters based at least in part on the plurality of observation vectors, a particular cluster of the plurality of clusters comprising a particular set of observation vectors representing a first set of hosts of the first medical system and a second set of hosts of the second medical system,
   at least some hosts of the first set of hosts and the second set of hosts dissimilar from each other with respect to network interactions performable by the respective hosts the medical provider network;
   in response to generating the plurality of clusters, identify a cluster profile for the particular cluster of the plurality of clusters;
   determine a system type to which both of the first medical system and the second medical system belong based at least in part on characteristics of the identified cluster profile;
   verify the system type using outside information, the outside information comprising information other than the network activity information and being associated with at least a portion of the plurality of hosts;
   determine at least one segment within the medical provider network based at least in part on the system type and verifying the system type, the at least one segment being specific to the system type and comprising a plurality of sub-segments that create a plurality of barriers within the at least one segment that affect network communications between:
   other hosts of the medical provider network outside the at least one segment; and
   the first set of hosts in a first sub-segment of the plurality of sub-segments and the second set of hosts in a second sub-segment of the plurality of sub-segment; and
   exclude or include, based on the at least one segment, a portion of the network communications between the other hosts and the first set of hosts and the second set of hosts on the medical provider network.

2. The system of claim 1, further comprising a collector server, the collector server configured to at least:
   collect the network activity information generated by the plurality of hosts; and
   save the network activity information in association with a data store; and
   provide the portion of the network activity information to the analyzer server.

3. The system of claim 1, wherein the at least one processor is further configured to access the memory and execute the computer-executable instructions to at least:
   receive a request to add a new host to the medical provider network; and
   assign the new host to a cluster of the plurality of clusters by comparing characteristics of the new host with characteristics of a first portion of hosts belonging to the cluster.

4. A computer-implemented method for automatically generating segments in a medical provider network, the method comprising:
- receiving, by a computer system, network activity information collected during an observation period, the network activity information describing interactions of a plurality of hosts of a first medical system and a second medical system on the medical provider network during the observation period;
- identifying one or more metrics based in part on at least a portion of the network activity information, the one or more metrics identifying relationships between hosts of the plurality of hosts;
- determining a plurality of observation vectors based at least in part on the one or more metrics, individual observation vectors of the plurality comprising one or more dimensions and representing individual hosts of the plurality of hosts;
- generating, by the computer system, a plurality of clusters based in part on the plurality of observation vectors, a particular cluster of the plurality of clusters comprising a particular set of observation vectors representing a first set of hosts of the first medical system and a second set of hosts of the second medical system at least some hosts of the first set of hosts and the second set of hosts dissimilar from each other with respect to network interactions performable by the respective hosts on the medical provider network;
- in response to generating the plurality of clusters, identifying a cluster profile for the particular cluster of the plurality of clusters;
- determine a system type to which both of the first medical system and the second medical system belong based at least in part on characteristics of the identified cluster profile;
- verifying the system type using outside information, the outside information comprising information other than the network activity information and being associated with at least a portion of the plurality of hosts;
- determining, by the computer system, a segment within the medical provider network based at least in part on the system type and verifying the system type, the segment being specific to the system type and comprising a plurality of sub-segments that create a plurality of barriers within the segment that affect network communications between:
- other hosts of the medical provider network outside the at least one segment; and
- the first set of hosts in a first sub-segment of the plurality of sub-segments and the second set of hosts in a second sub-segment of the plurality of sub-segments; and
- exclude or include, based on the segment, a portion of the network communications between the other hosts and the first set of hosts and the second set of hosts on the medical provider network.

5. The computer-implemented method of claim 4, further comprising:
- collecting the network activity information generated by the plurality of hosts; and
- saving the network activity information in association with a data store.

6. The computer-implemented method of claim 4, wherein the network activity information is collected using third-party collection software, the network activity information provided in at least one of the following formats: Internet Protocol Flow Information Exchange, Domain Name System (DNS) records, web proxy records or packet capture.

7. The computer-implemented method of claim 4, further comprising:
- receiving a request to add a new host to the medical provider network; and
- assigning the new host to a cluster of the plurality of clusters by comparing characteristics of the new host with characteristics of a first portion of hosts belonging to the cluster.

8. The computer-implemented method of claim 4, further comprising:
- in response to generating the plurality of clusters, identifying a target host belonging to the particular cluster at a first time when the cluster profile is identified; and
- determining a host profile for the target host with respect to a comparison of the cluster profile and a subset of network activity information for the target host.

9. The computer-implemented method of claim 8, further comprising:
- after determining the host profile, monitoring first network interactions of the target host; and
- providing an indication to an authorized user when a portion of the first network interactions indicate that the target host is operating outside of the host profile.

10. The computer-implemented method of claim 4, further comprising:
- in response to generating the plurality of clusters, identifying a compromised profile for a second cluster of the plurality of clusters, the compromised profile representative of compromised hosts; and
- comparing first network interactions of the plurality of hosts with the compromised profile to determine whether a particular host of the plurality of hosts has been compromised.

11. The computer-implemented method of claim 4, wherein identifying the cluster profile for the particular cluster of the plurality of clusters comprises:
- receiving a plurality of cluster profiles from a third party, the cluster profile included in the plurality of cluster profiles; and
- selecting the cluster profile from among the plurality of cluster profiles based at least in part on characteristics of the particular cluster.

12. The computer-implemented method of claim 4, wherein determining the segment within the medical provider network comprises determining a plurality of segments, each segment of the plurality of segments including or excluding at least one potential system.

13. The computer-implemented method of claim 12, wherein the plurality of segments comprises at least one of a device segment, an application segment, a user segment, a clinical segment, a profile user segment, a department segment, a medical device segment, or a control system segment.

14. The computer-implemented method of claim 4, wherein the plurality of clusters is generated using one or more clustering techniques, the one or more clustering techniques comprising at least one of a k-means clustering technique, a hierarchal clustering technique, an expectation maximization clustering technique, a density-based special clustering of applications with noise technique, or a self-organizing map clustering technique.

15. A computer-implemented method for identifying compromised profiles using probability profiles, the method comprising:

receiving, by a computer system, network activity information collected during an observation period, the network activity information describing interactions of a user with a plurality of hosts on a medical provider network during the observation period, each of the plurality of hosts associated with at least one sub-segment of a plurality of segments of the medical provider network;

determining a client profile based at least in part on the network activity information corresponding to the interactions of the user with at least a portion of the plurality of hosts on the medical provider network, the client profile comprising an identified state path for the user that identifies the portion of the plurality of hosts and an order according to which the user has previously accessed the plurality of hosts;

determining, by the computer system and based on the client profile, a probability profile for the user, the probability profile including a prediction that the user will use a client device to interact with a next host of the plurality of hosts given a current host selected from the portion of the plurality of hosts, individual hosts of the plurality of hosts dissimilar from each other with respect to network interactions performable by the plurality of hosts on the medical provider network;

verifying the probability profile using outside information, the outside information comprising information other than the network activity information and being associated with at least the portion of the plurality of hosts;

determining, based on the probability profile and a first host with which the client device has interacted, that a particular interaction of the client device with a second host of the plurality of hosts falls outside the probability profile of the user;

providing an indication about the particular interaction to an authorized user, the indication including the probability profile; and excluding future network communications of the client device on the medical provider network based on the particular interaction falling outside the probability profile for the user.

16. The computer-implemented method of claim 15, wherein the probability profile comprise a probabilistic determination for subsequent hosts of the portion of the plurality of hosts, given the current host selected from the portion of the plurality of hosts.

17. The computer-implemented method of claim 15, wherein the client profile comprises a state machine representative of the network activity information corresponding to the interactions of the user with the portion of the plurality of hosts on the medical provider network.

18. The computer-implemented method of claim 4, wherein:

generating the plurality of clusters comprises:

determining a centroid for each cluster of the plurality of clusters;

determining a distortion for each cluster of the plurality of clusters; and generating, based at least in part on the centroid and the distortion for each cluster, a data structure that includes at least a host identifier, a cluster identifier, and an observation vector; and identifying the cluster profile is based on the data structure.

* * * * *